US006647142B1

(12) United States Patent
Beardsley

(10) Patent No.: US 6,647,142 B1
(45) Date of Patent: Nov. 11, 2003

(54) BADGE IDENTIFICATION SYSTEM

(75) Inventor: Paul Beardsley, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 633 days.

(21) Appl. No.: 09/628,461

(22) Filed: Jul. 31, 2000

Related U.S. Application Data

(63) Continuation-in-part of application No. 09/377,556, filed on Aug. 19, 1999, now Pat. No. 6,315,197.

(51) Int. Cl.[7] ............................ G06K 9/00; G06K 9/48; G06K 9/36; G06K 7/12; G06F 7/08
(52) U.S. Cl. .................. 382/165; 382/164; 382/199; 382/286; 235/381; 235/469; 235/470
(58) Field of Search .................. 382/162, 164, 382/165, 103, 115, 116, 118, 173, 181, 190, 199, 209, 203, 286; 235/381, 382, 382.5, 454, 462.1, 462.02, 462.03, 462.13, 469, 470, 494; 386/46; 358/906; 705/43

(56) References Cited

U.S. PATENT DOCUMENTS

| | | | | |
|---|---|---|---|---|
| 5,550,928 A | * | 8/1996 | Lu et al. ................... | 382/116 |
| 5,694,514 A | * | 12/1997 | Evans et al. ................ | 386/46 |
| 5,881,171 A | * | 3/1999 | Kinjo ........................ | 382/199 |
| 5,887,082 A | * | 3/1999 | Mitsunaga et al. ......... | 382/199 |
| 5,930,391 A | * | 7/1999 | Kinjo ........................ | 382/173 |
| 6,023,334 A | * | 2/2000 | Itagaki et al. ............... | 356/600 |
| 6,315,197 B1 | * | 11/2001 | Beardsley .................. | 235/381 |
| 6,335,985 B1 | * | 1/2002 | Sambonsugi et al. ....... | 382/190 |
| 6,453,069 B1 | * | 9/2002 | Matsugu et al. ............ | 382/173 |

FOREIGN PATENT DOCUMENTS

WO    WO 00/04711    1/2000

* cited by examiner

Primary Examiner—Andrew W. Johns
Assistant Examiner—Amir Alavi
(74) Attorney, Agent, or Firm—Dirk Brinkman

(57) ABSTRACT

A method dynamically identifies a badge in a sequence of images of a scene acquired by a camera. Each image in the sequence includes a plurality of pixels, and each pixel has a color and an intensity. Each image is scanned to detect a border pixel. Adjacent pixels to the border pixel are connected to determine a connected region of pixels. An inner boundary of the connected region is determined, and an ellipse is fitted to the inner boundary. The internal pixels inside the ellipse are distorted to a circular form, and a plurality of spokes are fitted to the distorted internal pixels to identify colored segments. Then, an unique identity is associated with each badge according to the colored segments.

13 Claims, 3 Drawing Sheets

BADGE IDENTIFICATION SYSTEM

CROSS-REFERENCE TO RELATED APPLICATION

This is a continuation-in-part of U.S. patent application Ser. No. 09/377,556, now U.S. Pat. No. 6,315,197 filed on Aug. 19, 1999 by Beardsley.

FIELD OF THE INVENTION

The invention relates generally to reading identification badges, and more particularly to reading colored badges using a camera and a vision system.

BACKGROUND OF THE INVENTION

Most prior art machine-readable badges, for example, bar codes and magnetic stripes, require some close proximity-between the badge and the badge reader, and can read only one badge at the time.

PCT Patent Application WO 00/04711 "Image Identification and Delivery System" with an international filing date of Jul. 13, 1999 describes a segmented tag for identifying individuals. There, a color photograph is converted to a gray-scale image upon which edge detection is performed. The system also converts from RGB to HSV colors and segmentation. The results of-the edge detection and color detection are ANDed to provide an indication of the identification tag. The system also checks the outer circumference of the tag, and the outer diameter of a central region.

That system has a number of deficiencies. First, the system only works with a single image. Second, the system requires that the individual wearing the badge is identified. Third, the camera needs to be aimed at the badge. Fourth, the camera needs to be activated either by the photographer, a system operator, or a radio signal. Fifth, the badge must be photographed face on. Sixth, the system does not process the image in real-time.

Therefore, it is desired to provide a machine readable badge, which can be read at a distance, and a system that can read multiple badges at the same time, and which can read badges from various angles. In addition, it is desired that the system operates passively in real-time without human intervention.

SUMMARY OF THE INVENTION

A method dynamically identifies a badge in a sequence of images of a scene acquired by a camera. Each image in the sequence includes a plurality of pixels, and each pixel has a color and an intensity. Each image is scanned to detect a border pixel. Adjacent pixels to the border pixel are connected to determine a connected region of pixels. An inner boundary of the connected region is determined, and an ellipse is fitted to the inner boundary. The internal pixels inside the ellipse are distorted to a circular form, and a plurality of spokes are fitted to the distorted internal pixels to identify colored segments. Then, an unique identity is associated with each badge according to the colored segments.

The border pixel having a border color and an intensity greater than a first threshold, and the adjacent pixels having the border color and an intensity greater than a second threshold, where the first threshold is greater than the second threshold. The pixels of each image are scanned in a left-to-right and top-to-bottom order. Pixels in the connected region are followed in a forward and left direction to detect the inner boundary.

DETAILED DESCRIPTION OF THE PREFERRED EMBODIMENT

Figure 1:
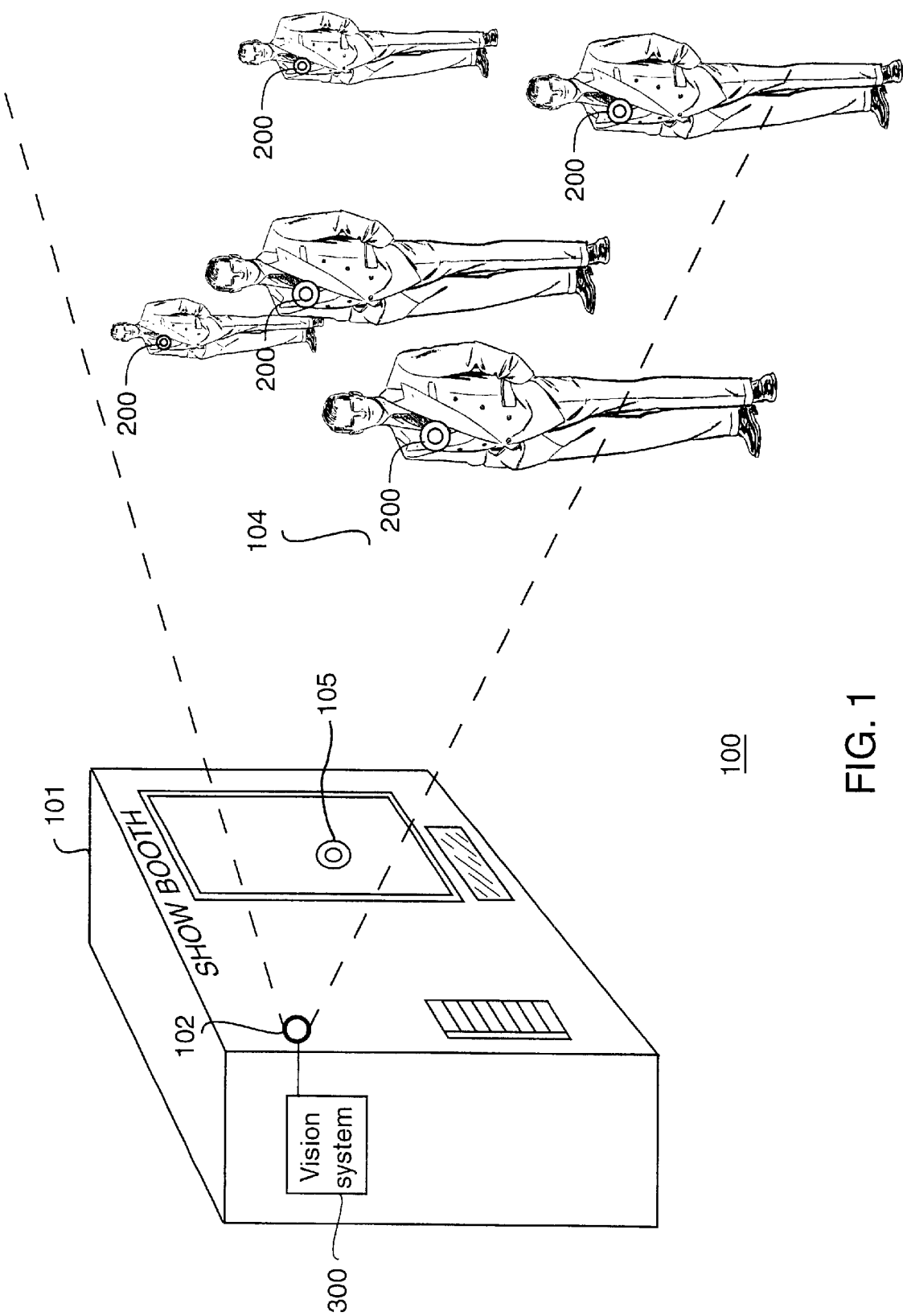
FIG. 1 is a block diagram of a badge identification system according to the invention.

FIG. 1 shows a badge identification system 300 according to the invention. The system 300 can be installed in a show booth 101 at a convention site. The system is connected to one or more cameras 102. Preferably, the cameras are digital. The cameras can be located at various locations. Each camera acquires concurrently a continuous sequence of images of a scene. The show booth can include an output device 105, such as a loudspeaker.

The system dynamically detects badges 200 attached to individuals or items in or entering the scene 104 in front of the camera or cameras in real-time. The batch 200 is used to uniquely identify the individuals or item. The identity of the badge can be used for marketing or tracking purposes. As an advantage, the system can operate in real time, identify multiple badges at once, and operate robustly in poor lighting conditions without the need of an operator. It should be noted that the badges could also be attached to other moving objects such as cars, trains, or products. As an additional advantage, the badge does not need to be oriented exactly perpendicular to the camera.

The camera 102 can be a Mitsubishi Electric Inc. "artificial retina" (AR), part number M64289U. The AR is a CMOS image sensor with 352×288 color sensitive pixels. The AR chip can achieve high performance at low power consumption. The vision system can be based on a Mitsubishi Electric Inc. single chip CMOS microcomputer, part number M32000D4AFP. The chip includes a 32-bit processor and 2 MB of DRAM and a 4 KB-bypass cache. The camera and controller together can be obtained for tens of dollars satisfying the need for relatively simple components having mass market appeal at a reasonable cost. The system 300 executes a badge identification method as described in greater detail below.

Identification Batch

Figure 2:
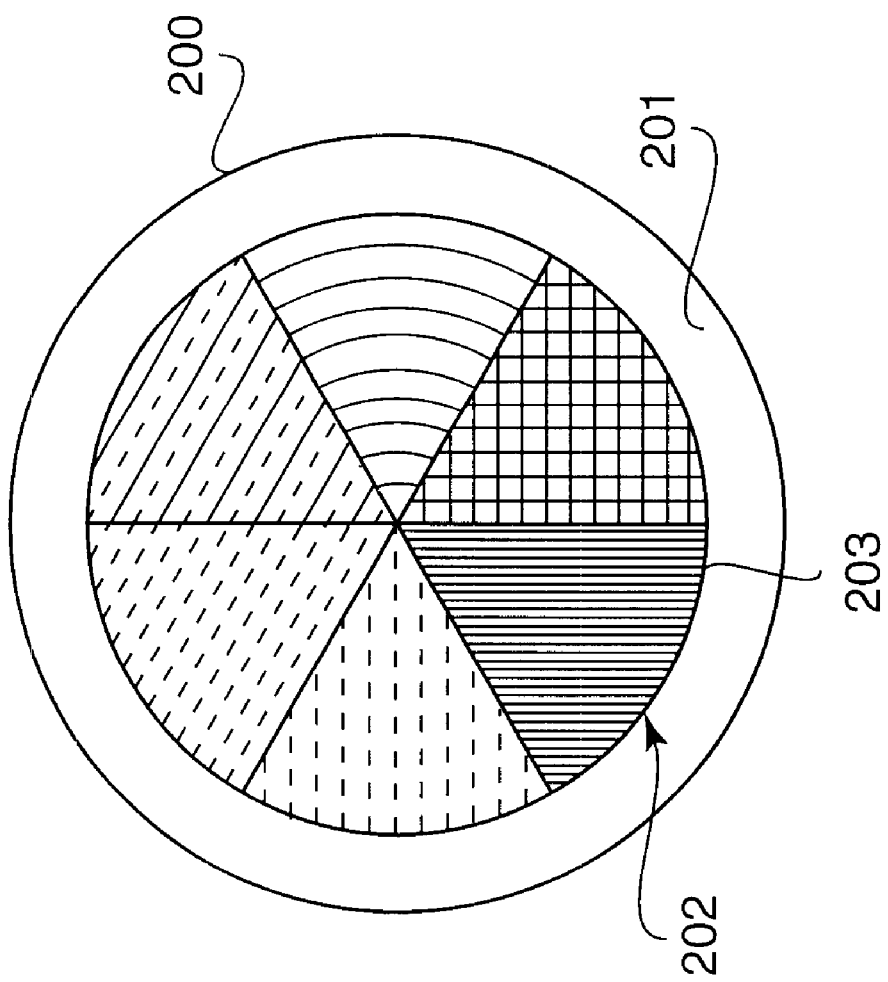
FIG. 2 is badge used by the system of FIG. 1.

As shown in FIG. 2, an identification batch 200 has the following properties. A boundary region 201 of the identification batch has a known background color, for example white. The boundary 201 is approximately circular in shape when viewed from the front. When viewed from an angle, the shape of the batch will appear elliptical. An internal boundary 202 of the boundary region 201 encloses an internal area segmented into different colors.

The number of segments can range from two to twelve, or larger depending on the size of the batch. The example batch has six segments. The color of a "key" segment 203 black, the other segments can be any arbitrary chosen colors, for example, red, blue, green, yellow, and orange. The key segment is used to determine a start point for decoding the other colored segments of the batch. Multiple segments can be the same color. Thus, given five colored segments and five possible colors, the number of unique color codings is $5^5$, or 3125. It should be noted that the system 300 can correctly identify badges with different number of segments, so that, for example, four, five and six segment badges can be used simultaneously to increase the total number of unique identification numbers.

The identification method, described below, can be applied to an identification batch printed on a shirt or other article of clothing. The badges can also be placed or printed on products, or vehicles, baggage, or anything else that can benefit from unique identification.

Detection Method

Figure 3:
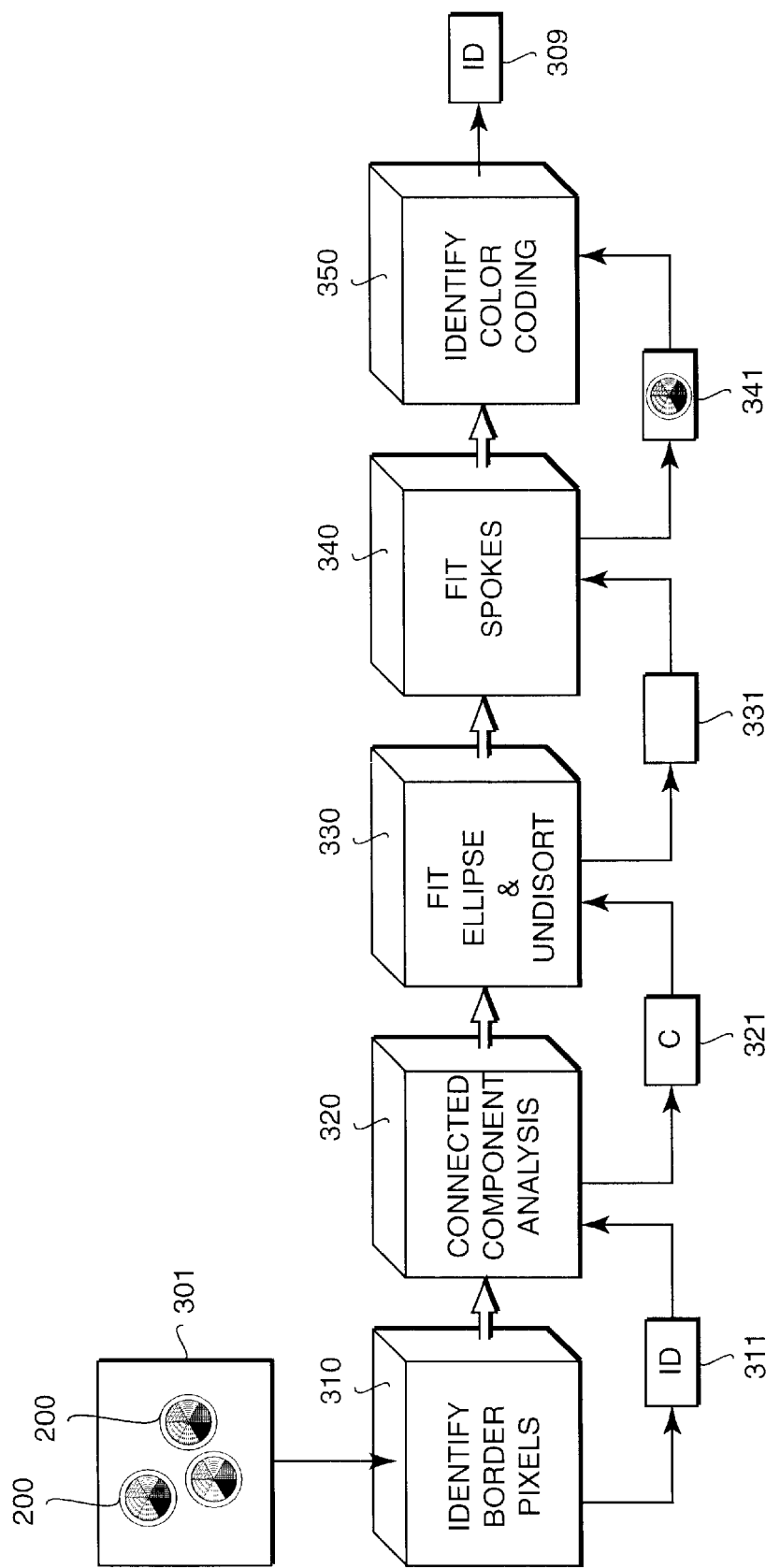
FIG. 3 is a flow diagram of a method used by the system of FIG. 1 to identify the badges of FIG. 2.

FIGS. 3 show the steps executed by the badge identification system 300.

Identify Potential Badge Borders

The method processes each image 301 of the sequence of images acquired by the one or more cameras. Each image in the sequence is processed as follows to first detect whether or not a badge is in the scene, and second to identify badge according to its coloring pattern.

First, the method attempts to detects 310 a border pixel (B) 311 in each image 301. A border pixel has a color that is substantially similar to a badge "border" color, e.g., white, and an intensity greater than T1. In order to accommodate various lighting condition, the camera and vision system can be calibrated to detect the border color for a particular lighting condition.

Potential border pixels can be located by scanning each image left-to-right for each row of pixels in a top-to-bottom order starting with the pixel in the top-left corner and ending with the pixel in the bottom-right corner of the image. A color-similarity test, described below, is used to detect the border pixel.

As soon as a border pixel is detected, a connected-component analysis 320 is performed as described below. The connected-component analysis accepts additional border pixels connected to the border pixel, as long as the additional border pixels also pass the color-similarity test, and have an intensity above a threshold value $T_2$, where $T_2 < T_1$. This step can be called pixel-by-pixel region growing.

The detecting and connecting of border pixels or region growing continues recursively, for all pixels of each image, to generate one or more connected regions (CR) 321. Each connected region is disjunct from the others. Each connected region is a potential badge border.

During this recursion, of scanning, detecting, and connecting of pixels in each image, any pixels that have already been identified as border pixels, or pixels inside a connected region are skipped.

An integral part of the connected-component analysis is the "marking" of pixels just outside and inside the connected border pixels. These pixels have failed the color similarity test or the intensity value test, or are at the extreme edge of the image. These pixels determine inside and outside boundaries, like the inside and outside boundaries of a donut. The boundaries and connected pixels are further processed in the following way.

A connected region of border pixels with a single boundary, which must therefore be its outer boundary, is of no further interest and is ignored, because there is no "hole." A connected region with multiple boundaries must enclose internal non-region "holes" and is subject to further processing as described in the next paragraph.

An arbitrary rule is defined for following the boundary pixels around their full length, e.g., the inside and outside boundary is always followed such that the associated connected border region is to the left of the forward direction. The boundary is followed, starting from an arbitrary start-point, and an integral value, which represents the change of forward direction from the start point, is kept. By the time processing returns to the start-point of the boundary chain, the integral value will be either $2\pi$ radians or $-2\pi$ radians, depending on whether the boundary is the inside or outside boundary of the region of connected pixels. Thus, the boundaries which correspond to an internal boundary can be discriminated and these are passed to the ellipse fitting stage below.

Color Similarity Test

The color similarity test, used above, determines whether a pixel in the image with RGB value $C_p=(R_p,G_p,B_p)$ is similar to a target color with RGB value $C_t=(R_t,G_t,B_t)$.

The target border color for the border is selected to be white. This test is partly invariant to changes of illumination. A unit three-vector $c_p=C_p/\text{mag}(C_p)$ is computed for the pixel color, where $\text{mag}(C_p)$ is the magnitude of $C_p$. Similarly, a unit three-vector $c_t=C_t/\text{mag}(C_t)$ is computed for the target color. The dot product $D=c_p \cdot c_t$ is calculated. If the dot product D exceeds a threshold $\tau$, then the color $C_p$ is accepted as similar to the target border color $C_t$.

Fitting an Ellipse to a Region Boundary

For each accepted inner boundary, an ellipse $\epsilon$ 331 is fitted 330 to the chain, using, for example, the ellipse fitting method of Fitzgibbon, and the RANSAC algorithm, see Fitzgibbon et al. in "Ellipse Fitting: Direct Least Square Fitting Of Ellipses," IEEE Trans. PAMI, Vol. 21, No 5, May 1999, Fischler et al. in "RANSAC: Random Sample Consensus: a paradigm for model fitting with application to image analysis and automated cartography," Commun. Assoc. Comp. Mach., Vol 24, 1981.

For each inner boundary, the RANSAC algorithm generates multiple possible ellipse solutions, each one of which is scored according to how well it fits. The highest scoring ellipse is kept as the best fit for a particular connected chain.

Any of the badges 200 in any image 301 of the sequence may have undergone perspective distortion, for example, a circular badge will appear as an ellipse under perspective projection when the badge is tilted away from the frontal position with respect to the camera. Therefore, an affine transformation is applied to the pixels inside the ellipse. In other words, the affine transformation distorts the inner pixels of the image so that they have a circular form again. Thus, the present invention does not require a perpendicular orientation between the badge and th camera.

Fitting "Spokes" to the Internal Segments of the Badge

Step 340 identifies color segments within the border of each badge by fitting spokes 341 as follows. First, the affine transformation is used to map the canonical form of the badge, i.e., the circular badge with segments, to each ellipse 331. This transformation defines the location of each badge segment, within the corresponding ellipse. However, the transformation is only known up to an unknown rotation of the badge. In other words, the correct rotation of badge "spokes," that is, the segment boundaries, to fit the image data in the ellipse is not known initially.

Next, a measure M is defined. The measure M is determined for each individual segment of a badge. The measure M has a relatively low value when many pixels in the segment are similar in color, and a relatively high value when the pixels in the segment are dissimilar in color.

Then, M is measured for each segment, and the sum of M over all segments is stored as $M_{SUM}$. The measure is defined below.

To account for the unknown amount of rotation, a new affine transform is defined which also maps the canonical form of the badge, to the ellipse, but with a different rotation of the spokes. Again $M_{SUM}$ is determined.

This is repeated for all possible rotations of the spokes. For example, the process may be repeated 36 times at 10 degree intervals for a full rotation. The rotation which gives the minimum value of $M_{SUM}$ determines the best mapping between the canonical form of the badge and the ellipse, in terms of ensuring that the interior parts of each segment consist of pixels of similar color. Thus, the spokes of the badge are fitted to the observed image data.

Definition of the Measure M

Given an alignment of badge segments with a particular ellipse, the pixels inside the ellipse are first grouped, with one group for each segment of the badge. These groups, or clusters, are then subject to K-Medoid clustering, to identify clusters of pixels which are close in RGB space, along with the centers of those clusters.

Next, take all pixels $P_j$ for a segment j of the badge. For each of the computed cluster centers, determine the total distance of all the pixels $P_j$ from that center. Find the minimum of this distance over all the cluster centers, called $PMIN_j$. Take the sum of $PMIN_j$ for all the badge segments. This is the measurement M.

Identify Color Coding

The spoke fitting from step 340 is used to identify 350 the color coding (ID) 309 from the relative position of the colored segments in the badge. For each segment, take the RGB values of the pixels in that segment and determine the medoid (the median of an n-dimensional measurements, in this case the 3-dimensional RGB values). The medoid with lowest intensity determines the black "key" segment 203. The medoid of all other segments are compared with pre-stored color values for all the possible badge colors, and the best match determines the color of each segment. After the colors of the various segments are determined, the arrangement of the colored segments determine the unique identification associated with the badge.

The system 300 is robust to changes in the appearance of colors of the badge using different cameras, and under different lighting conditions. The system continues to work until the diameter of the badge in the image is reduced to about 15 pixels. This means, that, given an average camera capturing 240×240 pixel images, badges of about 12 cm diameter can be detected at distances up to about three meters from the camera. The range is increased with larger badges, or higher resolution cameras.

Applications

The identification of color-coded badges as described herein has a number of different applications.

Badges can be used to track people in buildings or outdoors. For example, on entry into a building, a person can be assigned a badge with a unique color-coding. Cameras placed at different portals or in different rooms can then detect the passage of a person through the portals or entry into a room, and record this information in a database. Note, the present invention does not require that any of the cameras be aimed at the badge. The system automatically detects a badge as soon as the badge enters the scene.

Many organizations have regular gatherings of large numbers of individuals at conventions and trade shows where products are sold or exhibited by member companies. Such conventions are important marketing tools for many companies. The attendance at these and other gatherings may total thousands of individuals and the sponsors of the convention as well as the participating companies desire to have detailed information regarding the attendees. Thus, identification badges are often required to include the attendee's name, a company name and address, and other information which can be easily read visually and/or information that may be easily scanned or read by computer operated devices. For example, the present system can track which individual is visiting which area of the convention, and even how long the individual lingered at a particular location by counting the number of successive images in which a badge appeared. The system can also determine the order in which the individual visited different locations.

Badges can be used to express information about the wearer's desires or preferences so that an automatic real-time interactive system can aid the wearer of the badge. For example, a person arriving at a sports stadium or theater is given a badge whose color-coding indicates their seating area. The system, which utilizes cameras at various portals and public transit areas, observes the wearer and interactively, e.g. by display or audio cues via the loudspeaker 105, guides them to the assigned seating area. Similarly, travelers can be guided to a correct bus line, or train platform, or a landing gate.

Badges can also be used to record the position of objects. For example, a color-coded badge can be attached to an automobile roof as it enters a multi-floor parking lot. Elevated cameras in the ceiling record the final parking position of the automobile. The driver takes the badge from the automobile roof on leaving the automobile. On return to the parking lot and displaying the badge to an interactive system, the driver is automatically directed to the automobile in its original parking space.

Badges can be attached to objects to make it easy to track their position. Badges can be used to track the motion of an erratically moving and difficult-to-track object. A viewer can then be presented with a stabilized view, in which the erratic motion of the object has been automatically cancelled out.

In support of applications where the badge encodes identity of a person or object, it is desirable to maintain a database of those badge color codings that are currently active. For example, when a person enters a building and is assigned a unique badge, that badge is registered as active in a database. When the person leaves the building and returns the badge, the badge is automatically removed from the database. This enables automatic checking for invalid or forged badges.

In support of applications where an observer is looking at images of people/objects with attached badges in real-time, it may be desirable to synthetically overlay the images to provide information about the badge's color coding in a more meaningful form. For example, a system which is observing people in buildings may replace the original view of the badge with an overlay of the word "staff" or "visitor," when that image is displayed to an observer.

Having now described a few embodiments of the invention and some modifications and variations thereto, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

I claim:

1. A method for dynamically identifying a badge in a sequence of images of a scene acquired by a camera, each image in the sequence including a plurality of pixels, each pixel having a color and an intensity, comprising:

detecting a boundary of the badge;

fitting an ellipse to the boundary;

distorting pixels inside the ellipse to a circular form;

identifying colored segments from the distorted pixels; and associating a unique identity with each badge according to the colored segments.

2. The method of claim 1 wherein the border pixel having a border color and an intensity greater than a first threshold, and the adjacent pixels having the border color and an intensity greater than a second threshold, where the first threshold is greater than the second threshold.

3. The method of claim 1 further comprising:

scanning the pixels of each image in a left-to-right and top-to-bottom order.

4. The method of claim 1 further comprising:

following pixels in the connected region in a forward and left direction to detect the inner boundary.

5. The method of claim 2 wherein each pixel of each image has a color value $C_p=(R_p,G_p,B_p)$ and the border color is $C_t=(R_t,G_t,B_t)$, and further comprising:

determine a unit three-vector $c_p=C_p/\mathrm{mag}(C_p)$, where $\mathrm{mag}(C_p)$ is a magnitude of $C_p$;

determining a unit three-vector $c_t=C_t/\mathrm{mag}(C_t)$ of the border color; and determine if a dot product $D=c_p \cdot c_t$ is greater than a threshold $\tau$ to determine if a particular pixel has the border color.

6. The method of claim 1 wherein a plurality of cameras acquire concurrently a plurality of sequences of images of a plurality of scenes, and further comprising:

tracking the badge in the plurality of scenes.

7. The method of claim 6 further comprising:

providing feedback via an output depending on a location of the badge in the scene.

8. The method of claim 1 wherein the badge is attached to an individual.

9. The method of claim 1 wherein multiple badges are concurrently and dynamically identified in the scene.

10. The method of claim 1 further comprising:

maintaining a database of information associated with each unique identity; and providing feedback via an output based on the associated information.

11. The method of claim 1 wherein the badge is attached to an object.

12. The method of claim 11 wherein the object is stationary.

13. The method of claim 11 wherein the object is moving.

* * * * *